(12) United States Patent
Michels

(10) Patent No.: US 6,893,199 B2
(45) Date of Patent: May 17, 2005

(54) SHEER RESISTANT FASTENER ASSEMBLY

(76) Inventor: Larry Michels, 512 Rock Springs Rd., Kingsport, TN (US) 37664

( * ) Notice: Subject to any disclaimer, the term of this patent is extended or adjusted under 35 U.S.C. 154(b) by 386 days.

(21) Appl. No.: 10/003,785

(22) Filed: Nov. 26, 2001

(65) Prior Publication Data

US 2003/0099525 A1 May 29, 2003

(51) Int. Cl.⁷ ............................................. F16B 21/00
(52) U.S. Cl. ...................................... 411/340; 411/344
(58) Field of Search ..................... 411/340–346, 546; 52/698; 403/384, 386, 388, 260

(56) References Cited

U.S. PATENT DOCUMENTS

| | | | | |
|---|---|---|---|---|
| 991,426 | A | * | 5/1911 | Clements .................... 411/340 |
| 2,018,251 | A | | 10/1935 | Croessant |
| 2,916,235 | A | * | 12/1959 | Nagel ......................... 248/497 |
| 3,248,994 | A | * | 5/1966 | Mortensen .................. 411/344 |
| 4,294,156 | A | * | 10/1981 | McSherry et al. .......... 411/345 |
| 4,502,826 | A | * | 3/1985 | Fafard ........................ 411/340 |
| 5,236,293 | A | * | 8/1993 | McSherry et al. .......... 411/344 |
| 5,275,518 | A | * | 1/1994 | Guenther ..................... 411/38 |
| 5,944,466 | A | | 8/1999 | Rudnicki et al. |
| 6,007,285 | A | | 12/1999 | Sisto et al. |
| 6,062,785 | A | | 5/2000 | McDermott |
| 6,161,999 | A | * | 12/2000 | Kaye et al. ................. 411/344 |
| 6,287,065 | B1 | * | 9/2001 | Berlin ......................... 411/340 |

* cited by examiner

Primary Examiner—William L. Miller
(74) Attorney, Agent, or Firm—Malcolm G. Dunn

(57) ABSTRACT

A shear resistant fastener assembly for supporting structures from a wall behind which there are no supporting framework, the wall defining therethrough an opening having a predetermined size and configuration and bordered by an interior peripheral surface having the thickness of the wall, the fastener assembly comprising an anchor plate having a predetermined length and a predetermined width and adapted to be inserted through the opening in the wall and to be positioned flatly against the rear surface of the wall, and an insert having a predetermined size and having a configuration the same as that of the wall opening and adapted to fit closely within the opening and against the interior peripheral surface of the opening, and including an arrangement for connecting together the anchor plate and the insert. The shear resistant fastener assembly also is adapted to secure together overlapping panels behind which there are no structural supporting members.

21 Claims, 8 Drawing Sheets

SHEER RESISTANT FASTENER ASSEMBLY

CROSS-REFERENCE TO RELATED APPLICATIONS

Not Applicable

REFERENCE TO A MICROFICHE

Not Applicable

BACKGROUND OF THE INVENTION

When hanging any structure from a relatively thin wall panel, such as a panel formed from a drywall, the best assurance of adequate support for such structure is to attach the structure through the drywall and into the wood stud behind the drywall to which the drywall is attached. Since wood studs or studs of any other material are typically placed every sixteen (16) inches on center or every twenty-four (24) inches on center, it is not always possible to locate the structure to be supported so as to secure the structure through the drywall to the stud.

Numerous devices have been invented and designed over the years for the purpose of increasing and providing more practical holding power for anchor bolts in walls, ceilings and floors. An early example, but certainly not the earliest, is the disclosure in the Croessant patent, U.S. Pat. No. 2,018,251 (1935), of an anchoring socket provided for an anchor bolt. This anchoring bolt comprises a bolt-supporting sleeve formed at the outer end of the socket, a nut secured at the inner end of the socket, a plurality of intermediate strips circularly spaced around the socket and connected at their respective one ends to the sleeve and connected at their respective other ends to the nut, and a bolt, which extends through the sleeve for threaded engagement within the nut. A suitable aperture is formed in a solid wall of masonry, concrete or the like at the location where an article is to be secured or supported and the aperture is of a size to enable insertion of the length of the anchoring socket substantially within the wall thickness of the aperture. The intermediate strips are each provided with a weakened portion at a predetermined point along their respective lengths. When a torquing force is applied to the bolt the nut is caused to be drawn toward the sleeve, thereby forcing a collapse or outward buckling of the intermediate strips and causing the intermediate strips to expand radially in a frictional gripping engagement against the interior surface of the aperture surrounding the anchoring socket, as shown in FIG. 7 of the Croessant patent.

Another socket example is shown in FIG. 5 of the Croessant patent, wherein the thickness of the wall is less than the length of the bolt-supporting sleeve of the anchoring socket, and the nut and intermediate strips extend into the cavity behind the wall. When a torquing force is applied to the bolt, which is threadedly engaged with the nut, the nut is axially drawn toward the sleeve, and the intermediate strips buckle or bend outwardly until the intermediate strips make engaging contact against the inner surface of the wall in circularly spaced relation from and around the end of the sleeve that projects into the cavity beyond the thickness of the wall. The patentee states that this circularly spaced wall engagement by the bends of the intermediate strips provides an enlarged base support to fixedly anchor the nut, and to engage the wall interior surface at a location removed from any weakness that may have been caused when the aperture was made for the anchoring socket.

In either example, as shown in FIG. 7 or in FIG. 5 in the Croessant patent, the anchor bolt may be removed and replaced as often as necessary with no loosening effect on the anchoring socket. Although the patentee offers no comment as to which example has the better holding power, it should be apparent that the engagement of the intermediate strips against the interior wall surface in the example of FIG. 5 would provide greater holding power than the frictional gripping engagement of the intermediate strips within the aperture in FIG. 7. Such frictional gripping engagement would be effective for light to moderate loads, while the circularly spaced wall engagement by the bends of the intermediate strips in FIG. 5 would be a better choice for heavy items such as shelves, towel rods, and the like.

To summarize this early state of the prior art, the intermediate strips form an anchoring mechanism, and the rotation of the threaded bolt causes the anchoring mechanism to expand and contact the rear or blind surface of the wall so as to anchor the anchoring socket in place.

Another more recent prior art example, but again not the earliest, is shown in the McDermott patent, U.S. Pat. No. 6,062,785 (2000), wherein the anchoring mechanism comprises two toggle members (see FIG. 6), which are spring-biased to expand behind the blind or rear surface of the wall when the threaded bolt is turned and the toggle members are caused to clear a restricting sleeve that is part of the anchoring socket and also the natural restriction against such expansion as formed by the thickness of the wall surrounding the aperture.

Still more current prior art examples of anchoring sockets are shown in the Rudnicki et al patent, U.S. Pat. No. 5,944,466 (1999) and the Sisto et al patent, U.S. Pat. No. 6,007,285 (1999). The Sisto et al patent, for example, points out some problems associated with prior art wall fasteners when used with gypsum board, for example. For instance, when a portion of the anchor mechanism is received within the hole prepared in the wall the stress exerted by heavy objects attached to the fastener on the outside of the wall may cause the fastener to pull outwardly through the opening. Another possible problem is that fasteners have to be installed carefully so as to insure that they are not overtorqued. Continued twisting of the threaded bolt after the anchor mechanism has made contact with the inner or rear surface of the wall will cause the anchor mechanism to twist and dig into the inner surface of the wall, thus gouging the periphery of the wall hole and destroying the paper surfaces of a drywall, for example, thereby causing the fastener to fit loosely within the wall because the holding power of the drywall has become lost. This would increase the likelihood that the fastener would become dislodged from the wall. The Sisto et al patent additionally points out that the supporting capacity/strength of conventional fastening structures is limited by a relatively short axis of rotation in the axial plane, the axis being defined as the distance between the points of support provided by the anchor assembly and the threaded member (bolt). This distance is equivalent to the thickness of the wall or wallboard, which the patentees assert is typically far too short to support large or heavy objects due to the high concentration of stresses over such a small area, when using, for example, a "molly" fastener.

The Sisto et al patent asserts that these problems are avoided by their fastener assembly, which allows relatively heavy objects to be attached to either a hollow or a solid core wall because the stresses exerted by such objects are distributed over a relatively wide area around the wall hole in which the fastener is anchored, and along a relatively long axial plane of support defined by their elongated cantilever structure. Their fastener assembly includes an elongated tubular body having a flange or face plate at its axial outer end. The tubular body defines an axial cavity dimensioned to receive a correspondingly dimensioned support member. When the elongated tubular body and support member are inserted into a properly dimensioned hole formed in a suitable support structure such as a wall, or ceiling, or floor, the rear face of the face plate contacts the portion of the support structure surface (that is, the exterior surface of the wall) that surrounds the hole. The elongated tubular body and the support member within the latter are maintained in position by an anchor member which is disposed proximate the distal or opposite axial end of the tubular body. The anchor member comprises a base portion defining a central threaded aperture, and a plurality of elongated wings, which extend from the base portion in a direction toward the face plate of the tubular body. The wings are bendable in the direction of the tubular body so as to allow the anchor member to be inserted through the wall hole. The wings are spring-biased so that they expand outwardly from the tubular body, and in the case of a hollow wall, the wings engage the inner surface of the wall when the anchor member clears the hole on the interior side or rear surface of the wall. A threaded member or bolt in inserted through the cavity of the tubular body and into the central threaded aperture of the anchor member. As the bolt is rotated, the anchor member is drawn closer to the face plate of the tubular body (in the case of a hollow wall). The outside diameter of the face plate is preferably selected so that the outwardly biased wings of the anchor member do not extend beyond the peripheral edges (s) of the face plate. This is said to ensure that stresses are distributed only over those portions of the surrounding wall which are in compression (that is, compression between the face plate on the outer or exterior side of the wall and the wings engaging the inner side or rear surface of the wall toward the face plate) and thereby provide substantially enhanced mechanical strength and stability.

In FIG. 6 of the Sisto et al patent, a handrail assembly or grab bar is shown being supported from a wall by two such fastener assemblies. The patentees point out that it is frequently impossible to retrofit handrail assemblies suitable for use by the handicapped and the elderly in bathrooms or the like due to lack of suitably positioned mounting structures (studs, etc.). They state that it was heretofore necessary to remove the existing wall panel and insert one or more additional studs or other solid structures so as to provide a sufficiently reliable connection, and that with their invention the need for such expensive retrofitting operations is completely avoided.

The above-mentioned Rudnicki et al patent, both inventors being the same as in the Sisto et al patent, discloses a similarly constructed and operating fastener assembly with several different embodiments, which may be also used to join two or more overlapping planar elements, such as in the construction of modern aircraft where rivets are typically used to join the individual sheets of aluminum that collectively form a skin over the air frame. Aligned holes in two overlapping members receive therethrough the anchoring assembly, which compresses the overlapping members together between the face plate and the anchor member positioned interiorly of the two overlapping members. The patentees state that the joining forces are imparted at three or more radially distributed regions that are located away from the peripheral edges of the aligned openings in the respective elements to be fastened. The anchoring assembly comprises three or more elongated wing members that extend from the threaded apertured base portion toward the rear or interior surface of the face plate. once the wing members clear the opening(s) they expand outwardly from their initial folded position, and as the threaded bolt is rotated the anchoring assembly is drawn closer to the face plate until respective distal tip regions of the wing members contact corresponding interior surface regions of the inner most structural element or wall or overlapping member, whichever the case. The regions of contact between the distal tip regions of the anchoring assembly are radially equidistant, that is, symmetrically arranged relative to the center of the opening, so that joining forces are exerted at evenly distributed locations remote from the edge of the opening while avoiding stress concentrations at the edges of the aligned openings resulting. The supporting structure of the anchoring assembly is sufficiently rigid as to resist continued movement of the base portion toward the face plate when the distal regions initially contact the interior surface of the wall or structural element.

The Rudnicki et al patent also indicates that the fastener assembly may be used to secure a kitchen cabinet or similar structure to a gypsum wall board structure.

All of these prior art fastener structures, as well as others well-known in the art but not specifically mentioned here, serve to provide a substitute supporting structure for drywalls, gypsum boards, any other relatively thin walls or structural elements, as well as for overlapping panels to be joined together, where there is an absence of a regular supporting structure therebehind, such as a stud or frame member, and at any location where an object of any appreciable weight is needed to be supported or to be secured, or where overlapping panels members are needed to be joined together. All of these fastener structures have anchor members that are designed to be radially expanded in some manner once they pass through an opening formed in the wall, ceiling or floor, or through aligned openings formed in overlapping panels to be joined, so as to resist withdrawal or falling out of the anchor members through the opening.

A small diametered fastener assembly and an object of significant weight to be supported thereby from a gypsum board forming the wall, for example, can produce sheer forces, that is, a force that acts parallel to the plane of the gypsum board wall, that in time, or possibly as a result of repeated vibration, such as might be caused by repeated slamming of nearby doors connected to the wall, cause loosening of the fastener assembly or tear-out of the fastener assembly through the wall.

The shear resistant fastener assembly disclosed herein, by the nature of its construction, is significantly sheer resistant, and does not depend upon anchoring structures that require radial expansion on the opposite or rear side of a wall. An opening is formed in the wall where and from which an object is to be supported and where there is no regular stud or framework already located behind the wall. The opening is of a size that enables an anchor plate member of a predetermined length and width and of a predetermined configuration to be inserted therethrough and then oriented to any position relative to the object to be supported from the wall. The anchor plate member is connected to an insert member, which is of the same size and configuration as the opening and therefore is designed to fill the opening in the wall and fit partly or wholly within the wall and be essentially flush with the exterior side of the wall.

The anchor plate member disclosed herein has on one side a large planar surface area that faces the rear surface of the wall and that thereafter is secured flatly against that rear surface by conventional fastening means, such as by use of screws that are extended through the wall and into the anchor plate member. This large planar surface area is greater than that of any known prior art, other than what a conventional supporting structure, such as a wood or metal stud, would provide if it could have been conveniently positioned in the same location. In other words, this large planar surface area provides a much greater "target" area for an installer of cabinets or other structures and objects to more easily "hit" with a screw than the "target" area presented by the aforementioned "molly" fastener. In the instant invention, a two inch wide by five inch long anchor plate, as only one example of what is easily possible to be used, the width alone is even wider than a conventional "2 by 4" wood stud since the width of a conventional stud is actually only 1½ inches instead of 2 inches. When considering also, the mentioned five inch length along with the two inch width, this is a significant "target" area. Further, before the anchor plate member of the invention is secured against the wall rear surface, it may be oriented to any position behind the wall 360 degrees around the opening in the wall, depending upon where on the wall, an object, for example, is to be supported; which is another significant advantage as well.

SUMMARY OF THE INVENTION

The present invention, therefore, is directed to a shear resistant fastener assembly for supporting structures from a wall behind which there are no supporting studs, the wall defining therethrough an opening having a predetermined size and configuration and bordered by an interior peripheral surface having the thickness of the wall. The shear resistant fastener assembly includes an anchor plate having a predetermined length and a predetermined width and defining at least a flat front surface. The anchor plate is adapted to be introduced or inserted through the opening in the wall and for its flat front surface to be positioned flatly against the rear surface of the wall. The shear resistant fastener assembly also includes an insert having a predetermined size and configuration the same as that of the opening in the wall and is adapted to fit closely within the opening and into engagement against the interior peripheral surface of the opening; the insert defines a flat front surface and a flat rear surface. The shear resistant fastener assembly further includes connecting structure for connecting together the anchor plate and the insert and is adapted to urge the anchor plate and its flat front surface toward and against the flat rear surface of the insert and also flatly against the rear surface of the wall.

The anchor plate has a rectangular configuration, the width and thickness of which is such as to enable introduction of the anchor plate through the opening in the wall, and the length of which is greater than that of the opening in the wall. The length of the anchor plate may be centered with respect to the center of the insert, or the length of the anchor plate may extend a greater distance from the center of the insert on one side of the insert than from its other side.

The anchor plate, when inserted through the opening in the wall, may be rotatable to position the anchor plate to a predetermined position relative to the rear surface of the wall.

The insert and the anchor plate may be secured together, and the insert may include a handle detachably connected to the center of the front surface of the insert. The handle aids in manually manipulating the anchor plate through the opening in the wall and for holding the anchor plate in a predetermined position against the rear surface of the wall until the anchor plate is secured against the rear surface of the wall.

The insert may have on its front flat surface an indicating mark pointing toward the center of the width of the anchor plate to show the location of the anchor plate when it is out of sight behind the wall.

The insert may define on its front surface at its outer periphery a flanged lip, which is adapted to be engaged against the front surface of the wall when the insert fits closely within the opening in the wall and into engagement against the interior peripheral surface of the opening.

The insert and anchor plate may be connected together by the use of a threaded screw extending through the center of the insert and into the anchor plate.

The anchor plate and the insert may each define a pair of guide holes formed at diametrically opposite locations in and through the insert and formed at diametrically opposite locations in and through the anchor plate. Each of the pair of guide holes at one of the aforementioned diametrically opposite locations in the insert is in direct axial alignment with one of the pair of guide holes at one of the diametrically opposite locations in the anchor plate. The anchor plate and the insert may then be connected together by a flexible loop member having two distal ends each of which is spaced from the other and is slidingly extended through one of the pair of guide holes in the insert and through the corresponding axially aligned guide hole in the anchor plate for securement at the rear surface of the anchor plate. When the anchor plate is positioned out of sight behind the rear surface of a wall and the insert is in position within the interior peripheral surface of the opening in the wall, the flexible loop is manually pulled to urge the anchor plate against the rear surface of the wall and into direct axial alignment of its pair of guide holes with the pair of guide holes in the insert.

The insert and the opening in the wall may be circular in configuration and the insert may include an outer annular sleeve member adapted to engage against the interior peripheral surface of the opening in the wall.

The insert and the opening in the wall may be circular in configuration, and the insert may define a circular core member having a circular peripheral surface and include an annular sleeve encircling and engaging against the circular peripheral surface. The annular sleeve has a front surface and a rear surface and defines on its front surface at its outer periphery a flanged lip adapted to be engaged against the front surface of the wall.

The shear resistant fastener assembly may also be used to secure together overlapping panels behind which there are no supporting structural. The overlapping panels define through the panels aligned openings having the same predetermined size and configuration and are bordered by interior peripheral surfaces having the collective thicknesses of the overlapping panels. The shear resistant fastener assembly includes an anchor plate having a predetermined length and a predetermined width and defines at least a flat front surface and is adapted to be inserted through the openings in the overlapping panels and for the front surface of the anchor plate to be positioned flatly against the rear surface of the innermost panel of the overlapping panels. The insert has a predetermined size and configuration the same as that of the openings in the overlapping panels and is adapted to fit closely within the openings and into engagement against the interior peripheral surfaces of the openings and defines a flat front surface and a flat rear surface. A connecting member is provided to connect together the anchor plate and the insert and is adapted to urge the anchor plate and its flat front surface toward and against the flat rear surface of the insert and also flatly against the rear surface of the innermost panel of the overlapping panels.

DETAILED DESCRIPTION OF THE INVENTION

Figure 1:
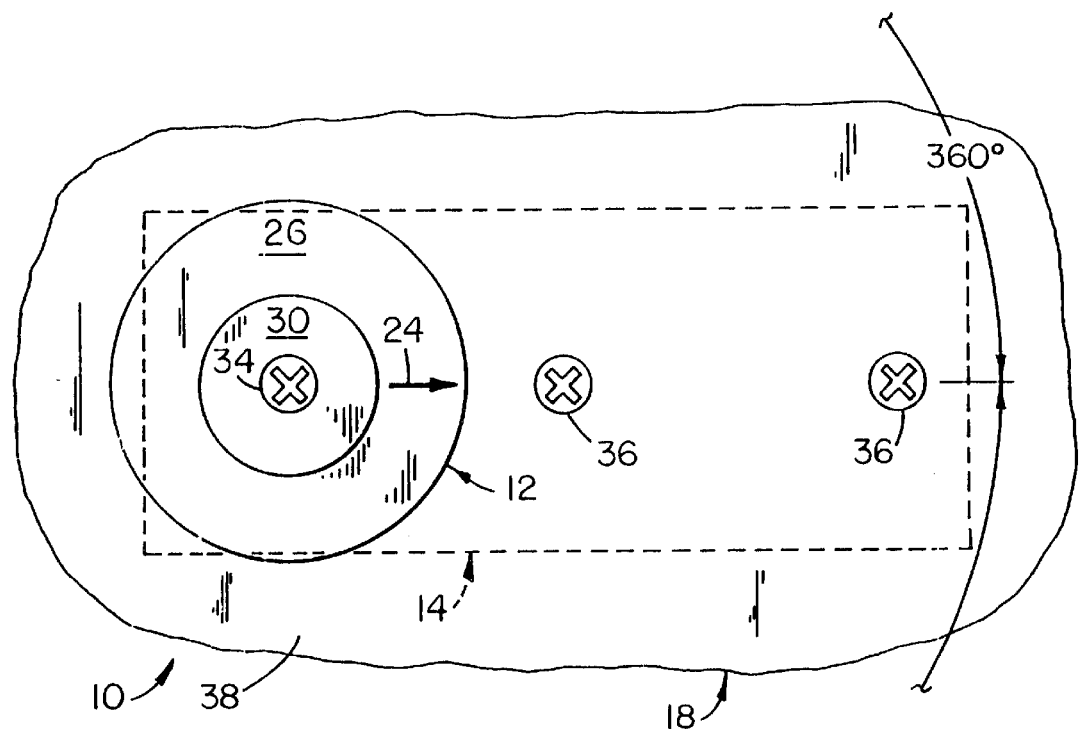
FIG. 1 is a plan view of the shear resistant fastener assembly of the invention having a circular insert and a rectangular anchor plate secured together with the anchor plate being shown in dotted lines because when installed through a hole in the drywall it is hidden behind the drywall; it also shows a handle detachably attached to the insert and by which the anchor plate is manipulatively inserted through the hole made in the drywall, and further showing that the anchor plate may be potentially rotatable 360 degrees around the hole in the drywall after insertion of the anchor plate behind the drywall.
Figure 2:
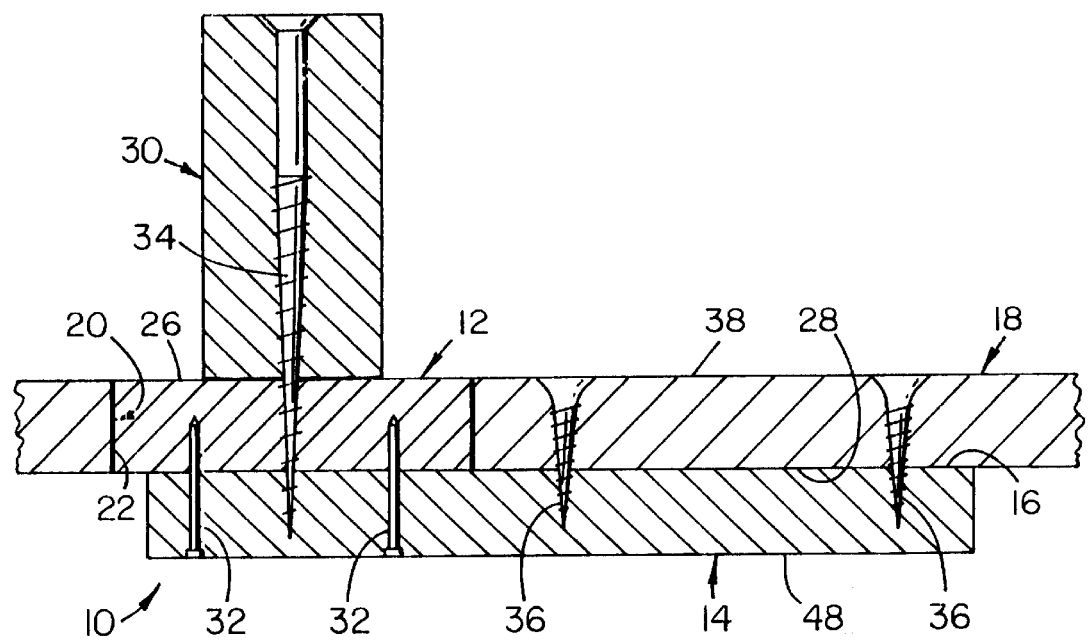
FIG. 2 is a side elevation view in cross-section of the shear resistant fastener assembly, detachable handle and drywall shown in FIG. 1.

In reference to the drawings, and initially to FIGS. 1 and 2, the shear resistant fastener assembly of the invention is shown at 10 and is for use in supporting objects or structures of various weights from wall panels, such as wall panels formed by drywalls. A drywall typically has a gypsum core sandwiched between heavy paper, the heavy paper providing the shear resistance for the drywall, and the drywall may, for example, be one-half (½) inch or five-eights (⅝) inch in thickness, the latter, obviously being the stronger of the two thicknesses. Other thicknesses for drywall are possible, but the ones mentioned are typically used in home and building constructions.

Figure 3:
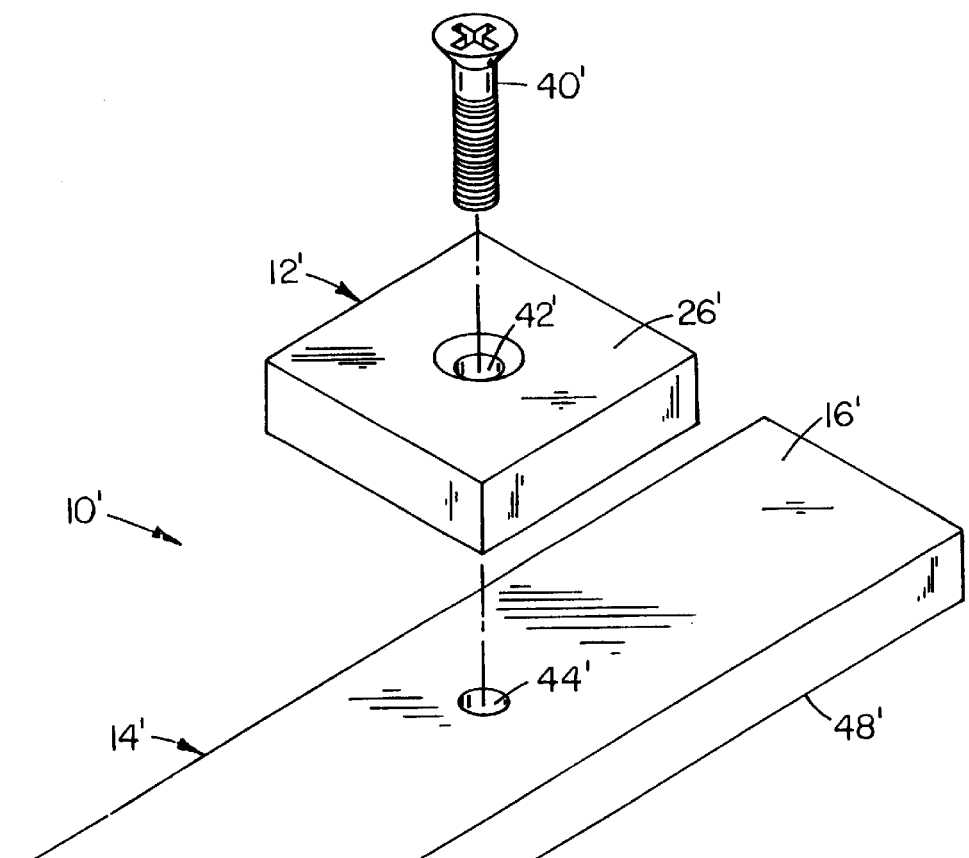
FIG. 3 is an isometric, exploded view of the shear resistant fastener assembly of the invention and illustrating an insert having a rectangular configuration.

The shear resistant fastener assembly 10 comprises two main elements: an insert 12 and an anchor plate 14. The "insert" is called such because it is designed to be inserted or to fit partly or wholly within the wall panel. The preferred configuration of the insert is circular for ease of formation, but it should be understood that the insert may also have a rectangular configuration, such as shown by the shear resistant fastener assembly 10' in FIG. 3, which shows a rectangular insert 12' along with the rectangular anchor plate 14'. The insert may also have a hexagonal or octagonal configuration or any other configuration (these are not shown). These other configurations are mentioned only to show that the concept of the invention should not be limited to circular inserts, even though the circular configuration is much easier to form, as by a hole saw, and is, therefore, much more practical in application. The "anchor plate" is called such because it is designed to be suitably anchored against the flat surface of the rear wall of the drywall or wall panel.

The anchor plate 14 is preferably rectangular in configuration, and has a predetermined width, a predetermined length and a predetermined thickness. The anchor plate 14 has at the very least a flat front surface 16 for engaging or being anchored flatly against the flat rear surface of a drywall, for example.

As shown in FIGS. 1 and 2, the shear resistant fastener assembly 10 is installed within the drywall 18. The anchor plate 14 has been introduced through the hole 20 made in and through the drywall and into the cavity (not shown) that is naturally formed behind the drywall and between the supporting studs or framework (not shown). Since the dimensions of a wood stud, for instance, to which a drywall is applied is usually 1½ inches by 3½ inches, the depth of the cavity would be at least 3½ inches. The anchor plate itself must have a width and a thickness that is less than that of the opening 20 in the drywall so that the anchor plate may be inserted through the opening. The preceding indicated depth of the cavity is usually sufficient to enable the manipulative insertion of a fairly long anchor plate, such as one being about five inches in length, for example. The latter length, or it could be of a lesser length within reason, is usually sufficient to provide an adequate anchoring structure into which screws may be inserted, with the screws passing first through the object or structure to be supported from the drywall, and through the drywall.

After insertion of the anchor plate, but before securing it to the drywall with the aforementioned screws, the anchor plate may be oriented to a predetermined position by rotating it relative to the hole 20 to a position where it is deemed needed. The anchor plate, therefore, is potentially rotatable 360 degrees, as shown in FIG. 1. The final position of the anchor plate depends upon where an object or other structure is to be supported from the drywall 18.

When the anchor plate 14 is introduced into the cavity behind the drywall, the anchor plate, obviously, becomes hidden from view by the drywall. In order to determine its location, an indicator mark 24 may be placed on the front surface 26 of the insert 12 after the insert and anchor plate have been suitably secured together. In this manner, and knowing beforehand the length and width of the anchor plate, a person using this invention only has to measure along the front surface of the drywall from the mark on the front surface 26 of the insert to determine the outlines of the length and width where the anchor plate will be located behind the drywall and insert within these outlines screws through the drywall and into the anchor plate behind the drywall.

One main purpose of the shear resistant fastener assembly 10 is its use for supporting objects or structures, such as cabinets, safety grab bars, towel racks, toilet paper holders, book shelves, and many other structures having various weights, from a wall behind which there are no supporting studs or frame work in the areas where the objects or structures are to be mounted.

Since supporting studs are usually positioned sixteen (16) or twenty-four (24) inches on center, it is not always possible to support an object or structure from a drywall, for instance, by connecting directly through the drywall and into a supporting stud. Obviously, if it were known beforehand where a structure is to be supported, adequate supporting studs or framework could have been installed before the drywall was installed. In most instances, however, decisions as to where some structure is to be supported are made some time after the drywall has already been installed. It is not very convenient later to remove portions of the drywall to install additional supporting structures behind where the drywall is installed and then replace the removed portions of the drywall.

Modern bathtubs, shower stalls, and the walls adjacent toilets may often incorporate safety grab bars so as to provide support to the people using same. The safety grab bars can be fastened to structural framing members through the walls behind where the safety grab bar(s) is or are to be supported. Such grab bars can be mounted vertically, horizontally, or diagonally and at different heights to accommodate the individual's requirements.

One arrangement that may be employed for manipulating the anchor plate into and through the opening 20 and then for drawing the anchor plate flatly against the rear surface 28 of the drywall is by use of a detachable handle 30, as shown in FIGS. 1 and 2. The insert and the anchor plate 14 may first be suitably connected together, as by gluing and then adding screws or small nails 32 (see FIG. 2), and then the handle may be temporarily secured to the front face of the insert by a wood screw 34 extending through the axial center of the handle and into the insert and anchor plate, as shown. It should be noted here, that the insert and anchor plate may also be molded in one piece, as from a suitable plastic or other comparably moldable, injectionable or pressable material, thus eliminating the need for gluing and nailing the insert and anchor plate together. Once the anchor plate is introduced into the cavity behind the drywall, the person manipulating the handle may cause the anchor plate to be drawn flatly against the rear surface 28 of the drywall until one or more drywall screws 36 (see FIG. 2) have been inserted through the drywall and into the anchor plate to secure it or anchor it to the rear surface 28 of the drywall. Thereafter, the handle and wood screw are removed and then screws are inserted through the object or structure to be supported from the drywall, through the drywall, and then into the anchor plate.

In the embodiment of the invention shown in FIGS. 1 and 2, the circular insert 12 has been positioned at one end of the anchor plate and extends or overlaps partly beyond the length and width of the anchor plate 14 so as to facilitate introduction or insertion of the anchor plate, as preconnected to the circular insert 12, through the opening 20 in the drywall 18. It will be observed from FIG. 2 that the thickness of the circular insert 12 is shown as being of the same thickness as the drywall 18. The shear resistant fastener assembly 10, however, may also be used where the thickness of the drywall may be greater than the thickness of the circular insert (not shown), which would result in the front surface 26 of the circular insert 12 being recessed with respect to the front surface 38 of the drywall 18. This latter situation would not matter from the standpoint of appearance because the resulting recess would subsequently be obscured by whatever object or structure that is to be supported from the drywall by the shear resistant fastener assembly 10.

In reference above to the discussion of the use of the shear resistant fastener assembly 10 for safety grab bars, as well as for other uses, *The Standard Consumer Safety Specification for Grab Bars and Accessories Installed in the Bathing Area*, for instance, requires that grab bars installed horizontally be able to withstand an applied downward load of 250 pounds. This amount of loading is to be applied over a 3½ inch area in the center of the grab bar for a period of five minutes, and there must be no visible damage during such loading. During this time the grab bar must not break or fail. The purpose of these tests is to assure that persons using the grab bars are enabled to maintain their balance, to prevent their falling or to assist them in exiting and entering.

The area of frictional contact of the anchor plate 14 against the rear surface of the drywall is quite significant. For instance, if the anchor plate should be five inches long by two inches wide, as previously suggested, the area of contact would be ten (10) square inches. If a safety grab bar were to be connected at both of its respective ends to two such shear resistant fastener assemblies 10, the weight possible to be supported by the safety grab bar would far exceed the minimum requirement of 250 pounds, as specified by the aforementioned ASTM F 446-85 standard. A drywall having a thickness, for example, of five-eights (⅝) inch would greatly resist tear-out over such a large square area, assuming proper surface preparation beforehand against deterioration of the drywall from any possible moisture in the bathroom environment.

Referring again to the insert 12, the size of the insert, as it fits partly or wholly within the hole in the drywall 18 and in engagement with the interior peripheral surface 22 of the hole, is alone sufficient to provide significant shear resistance and resistance against tear-out and loosening from its position within the drywall. Once the papered surfaces of the drywall become torn, for instance, the gypsum core can break down around the hole in the drywall. Compare, for example, the difference between use of the insert, which may have as an example a circular configuration having a diameter of two (2) inches, and the use of a "molly" fastener, which may have as an example a circular configuration having a diameter of ¼ or 0.25 inch.

In the case of an insert, the thickness of a circular configuration could be 7/16 or 0.4375 inch, which means that in a drywall having a ⅝ inch thickness, the insert would only extend 7/16 inch of the ⅝ inch thickness of the drywall within the interior peripheral surface 22 of the hole 20. If a weight were to be supported by the insert alone, only the circumferential surface area of the lower half of the insert would actually be caused to bear down against the engaged corresponding circumferential surface area of the lower half of the interior peripheral surface 22 of the hole 20. The surface area of the interior peripheral surface engaged by the insert may be calculated by the equation: $(2 \times pi \times r) \times h$, where $pi=3.14$, $r=1$ inch (the radius of the 2 inch diametered insert), and $h=7/16$ or 0.4375 inch (the length or thickness of the insert) with the result being divided by 2 since only the lower half of the circumferential surface of the insert would be brought to bear against the interior peripheral surface 22 of the hole 20, as previously mentioned. The equation, therefore, would be carried out as follows: $2 \times 3.14 \times 1 \times 0.4375 = 2.7475$ divided by $2 = 1.37375$ square inches. Then, to calculate the pressure against the engaged portion of the interior peripheral surface 22, the equation would be Pressure=Force/Area. Let us assume that a grab bar is to be supported by the insert alone and that the test load is to be 250 pounds; 250 pounds, therefore, is the amount of the force. The area, as previously calculated above for the engaged portion of the interior peripheral surface 22 of the hole 20 by the insert, is 1.37375 square inches. Dividing 250 pounds by the area, 1.37375 square inches, would result in a pressure of 181.98362 pounds per square inch.

In the case of a one-quarter inch diameter "molly" fastener used to support a grab bar, and employing the same equation for calculating surface area engaged by the lower half of the "molly" fastener in a hole formed for the extension therethrough of the "molly" fastener: $(2 \times pi \times r) \times h$, where $pi=3.14$, $r=0.125$ inch (the radius of a one-quarter inch diametered "molly" fastener), and $h=\frac{5}{8}$ or 0.625 inch (the "molly" fastener, as it extends completely through the hole made in the ⅝ inch drywall for it would, of course, bear against the full thickness of ⅝ inch). The resulting calculation would be $2 \times 3.14 \times 0.125\,inch \times 0.625\,inch = 0.490625$ divided by $two = 0.2453125$ square inch. Then, calculating pressure against the engaged interior peripheral surface of the hole by the "molly" fastener, the equation would again be Pressure=Force/Area, or a force of 250 pounds divided by the area of $0.2453125 = 1019.1082$ pounds per square inch, which would be a significant force tending to loosen if not causing possible tear-out of the "molly" fastener from its position in the drywall.

In the instance above of the use of a "molly" fastener, the fastener has only its own small diametered contact with the hole made for it in the drywall, whereas in the instance of the use of the shear resistant fastener assembly 10 of the invention, both the insert and the anchor plate cooperate together to provide support and to resist shear and tear-out from the drywall where the shear resistant fastener assembly is installed.

But to place the examples above in proper perspective, one would not reasonably attempt to use only a one-quarter inch "molly" fastener to support a safety grab bar from a drywall because the "molly" fastener would soon pull out. Also, one would not reasonably attempt to support a safety grab bar by use of only the insert of the shear resistant fastener assembly 10 of the invention. A person weighing 250 pounds, for example, starting to slip or fall, would not only bear down against the engaged circumferential portion of the interior peripheral surface by the insert, but also would likely exert a significant pulling force on the insert from the drywall because of the fact that a grab bar typically extends about three (3) inches from the surface of the drywall. The insert by itself would likely pull out. When, however, the anchor plate is used in conjunction with the insert, the entire anchor plate would have to pull physically out through the structure of the drywall before there could ever be a failure of the shear resistant fastener assembly 10 in supporting the grab bar because of the significant large surface area of contact of the anchor plate with the rear surface of the drywall.

When the shear resistant fastener assembly 10 of the invention is installed within the hole 20 formed in the drywall, the insert 12, as previously indicated, is designed to be inserted or to fit partly or wholly within the wall panel or drywall, and the front surface 26 of the insert may or may not be flush with the front surface 32 of the drywall 18.

Figure 4:
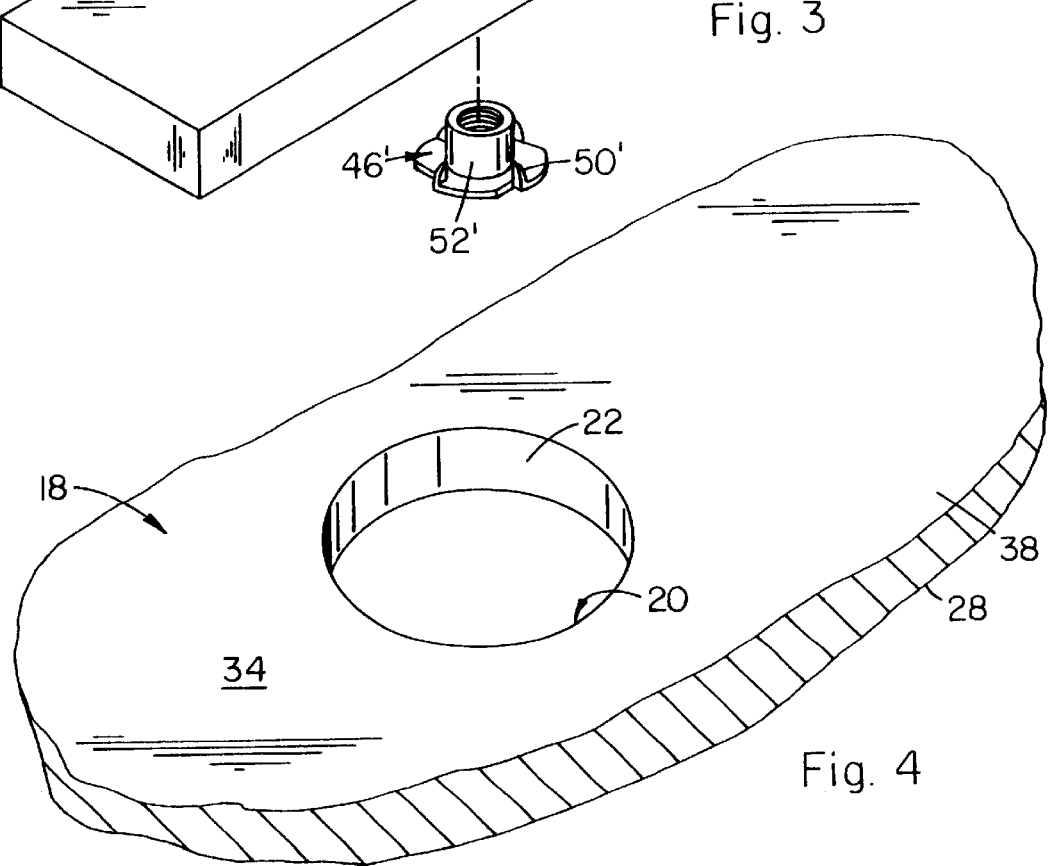
FIG. 4 is an isometric view of part of a drywall, its edge partially shown in cross-section, and illustrating the hole formed through the drywall within and through which the shear resistant fastener assembly will be installed and also illustrating the interior peripheral surface defining the hole in the drywall.

In reference to FIG. 4, the drywall 18 is shown in and through which the hole 20 is made having the same circular configuration as that of the insert 12 in FIGS. 1 and 2. The hole 20 is bordered or defined by the interior peripheral surface 22, which of course has the same thickness as that of the drywall.

Figure 5:
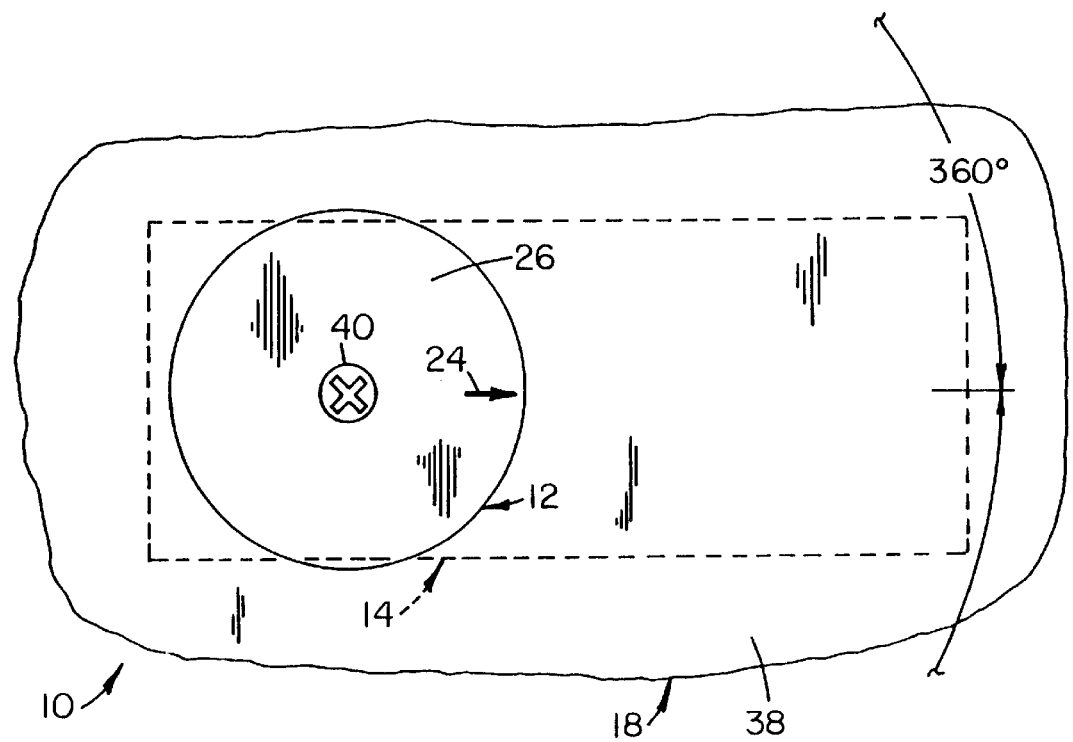
FIG. 5 is a plan view of the shear resistant fastener assembly of the invention installed within and through a hole in a drywall, and illustrating a reposition of the insert shown in FIGS. 1 and 2 so that the insert is positioned within the length of the anchor plate and is closer to one end of the anchor plate than from the other end, the anchor plate being shown in dotted lines because it is hidden when installed behind the drywall, and further illustrating that the anchor plate is potentially rotatable 360 degrees when positioned behind the drywall.
Figure 6:
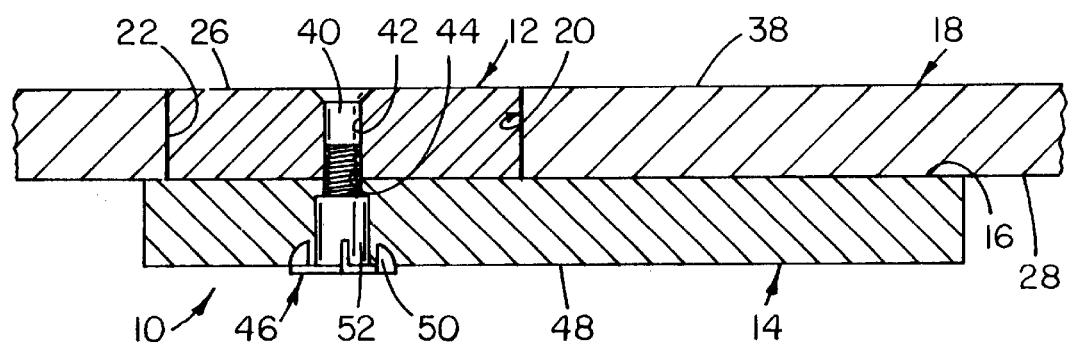
FIG. 6 is a side elevation view in cross-section of the shear resistant fastener assembly shown in FIG. 5 and shows the drywall in cross-section.

In reference to FIGS. 5 and 6, these drawings show that the circular insert 12 will have a diameter slightly greater than the width of the anchor plate 14. The circular insert may also be moved or positioned inwardly of one end of the anchor plate so that upon insertion of the anchor plate into the drywall, there is a portion of the anchor plate on one side of the circular insert that bridges over and extends slightly past the hole in the drywall behind the drywall, while on the other side of the insert there is a greater length of the anchor plate extending beyond the circular insert behind the drywall. In other words, the length of the anchor plate extends a greater distance from the center of the circular insert on one side of the circular insert than from its other side. When hanging cabinets, for example, it may be deemed more advantageous to position the anchor plate so that it is vertically positioned behind the drywall rather than being horizontally positioned. In the horizontal position, for instance, a heavy cabinet would tend to produce a rotational force upon the longer side of the anchor plate, unless additional drywall screws were to be inserted through the cabinet rear wall, and through the drywall and into the longer side of the anchor plate. In the vertical position, on the other hand, there would be no rotational forces produced by the heavy cabinet because all weight of the cabinet would produce a down shear force that would be transmitted to the circular insert and upon the lower half of the interior peripheral surface 22 (of the hole) against which the circular insert 12 bears. When positioning the shear resistant fastener assembly in the vertical position, the insert may be positioned nearer one of the ends of the anchor plate than from the other end.

The insert 12 and anchor plate 14 shown in FIGS. 5 and 6 are the same embodiments as shown in FIGS. 1 and 2 except that in FIGS. 5 and 6 the insert and anchor plate are not shown as being pre-attached together, as by gluing and small nails or by molding as a single unit, before insertion of the anchor plate behind the dry wall 18. Also, the detachable handle shown in FIGS. 1 and 2 has been omitted from the insert shown in FIGS. 5 and 6 because in this repositioning of the insert, the handle is not used. Another difference is that once the anchor plate has been introduced or inserted through the hole 20 in the drywall, a machine screw or bolt 40 is inserted into and through the hole 42 made through the center of the insert 12 and into and through the hole 44 made through the anchor plate for threaded connection with a tee nut 46, partially embedded in the rear surface 48 of the anchor plate 14. The tee nut is a stamped sheet metal fastener, which has an anchoring base that is caused to be embedded by means of prongs 50 in the rear surface 48 of the anchor plate around the hole 44 made for the machine screw or bolt. The tee nut also has a tubular threaded bushing 52 for receiving the remote end of the machine screw 40.

Figure 7:
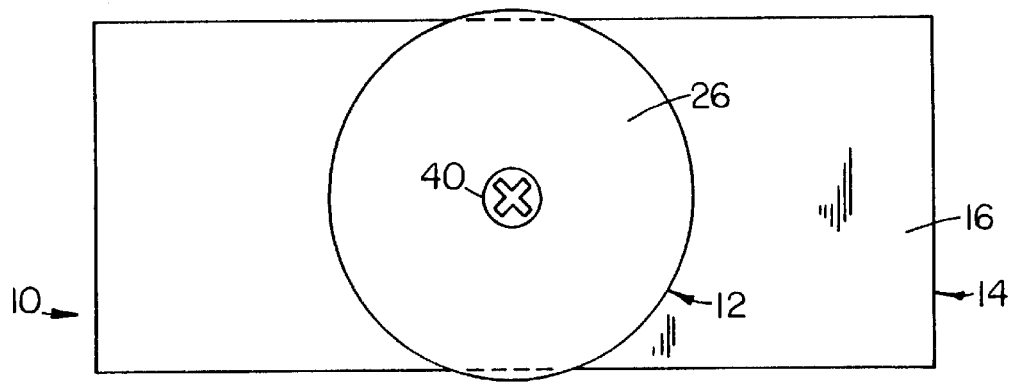
FIG. 7 is a plan view of the shear resistant fastener assembly illustrating the circular insert as being centered with respect to the length of the anchor plate.
Figure 8:
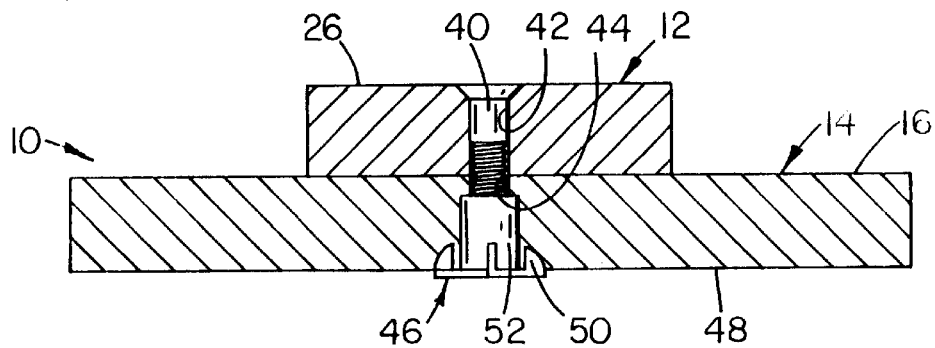
FIG. 8 is a side elevation view in cross-section of the shear resistant fastener assembly shown in FIG. 7.

In reference to FIGS. 7 and 8, the insert 12 is shown as being centered along the length of the anchor plate 14. After the anchor plate is in position behind the drywall (not shown in this drawing figure), a screw, such as a wood screw, but more preferably the previously mentioned machine screw or bolt 40 as shown may be inserted through the hole 42 made through the center of the insert 12 and into and through the hole 44 made through the anchor plate 14, with the remote end of the machine screw 40 being received within the threaded bushing 52 of the tee nut 46 to secure the insert and anchor plate together.

Figure 9:
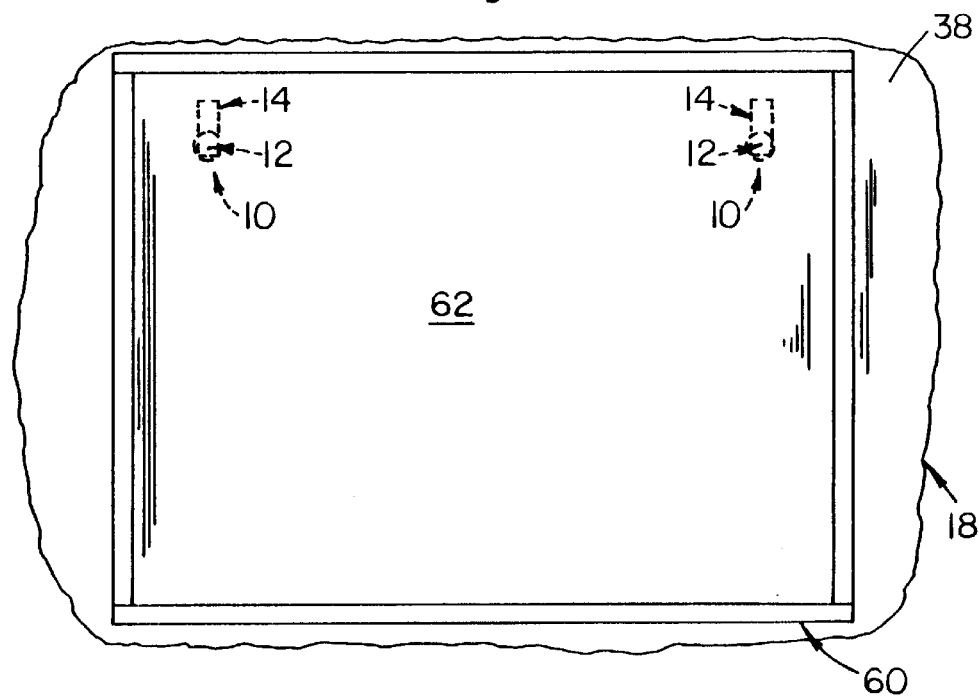
FIG. 9 is a front elevation view of a cabinet supported from a drywall by two shear resistant fastener assemblies, which are shown in dotted lines because when installed they are both hidden behind the rear wall of the cabinet.

In reference to FIG. 9, this drawing shows, for instance, a cabinet 60, which is supported from the drywall 18 by two shear resistant fastener assemblies 10. Each insert 12 of the shear resistant fastener assembly, which is shown in dotted lines because it is hidden behind the rear wall 62 of the cabinet, is circular in configuration. The anchor plate 14 is also shown in dotted lines because it too is hidden behind the drywall 18. Appropriate screws may be inserted through the rear wall 62 of the cabinet 60, then into the drywall 18, and finally into the anchor plate 14 of the shear resistant fastener assembly to firmly anchor the cabinet to the drywall. Additional shear resistant fastener assemblies may be used if necessary, if the weight of the cabinet and the weight of what will be stored in the cabinet are considered to require such.

The cabinet installation example of FIG. 9, discussed above, results in some advantages not believed to be known in the prior art. For instance, one usual manner of mounting a cabinet on a drywall behind which there are no supporting studs or framework involves physically holding the cabinet against the drywall in the position where the cabinet is to be mounted. The cabinet must be aligned and leveled while it is being physically held up to drywall, and then holes are drilled through the rear wall of the cabinet and into the drywall behind the cabinet. The cabinet is then set aside and fastener assemblies of the prior art, such as the "molly" fastener, are installed, each in one of the drilled holes made in the drywall. The cabinet is again held up in position on the drywall, and the drilled holes in the rear wall of the cabinet must be aligned to meet with the corresponding drilled holes and fastener assemblies in the drywall because the cabinet and its rear wall otherwise obscure the location of the fastener assembly, and the fastener assembly itself presents a very small target area. Screws are then inserted through the drilled holes in the cabinet rear wall and into the corresponding fastener assemblies or "molly" fasteners.

In comparison, the dimensions of the cabinet may be taken of the cabinet, and marks made on the drywall to determine the "footprint" to be occupied by the cabinet when it is mounted on the drywall. Appropriate configured holes are drilled through the drywall at appropriate locations within the "footprint," and a shear resistant fastener assembly is installed within each hole. Marks may be made on the drywall outside the "footprint" in alignment with the anchor plates of the shear resistant fastener assemblies to show their locations. The cabinet is lifted into position on the drywall within the "footprint," aligned and leveled, and the location of the marks on the drywall is noted and then wood screws are inserted through the rear wall of the cabinet, through the drywall, and into the respective anchor plates. The anchor plates act like wood studs, and as previously indicated, each anchor plate presents a much larger target area than conventional fastener assemblies of the prior art, and there is no necessity of attempting to align a preformed hole in the cabinet rear wall with the hole in a "molly" fastener, for instance.

Figure 10:
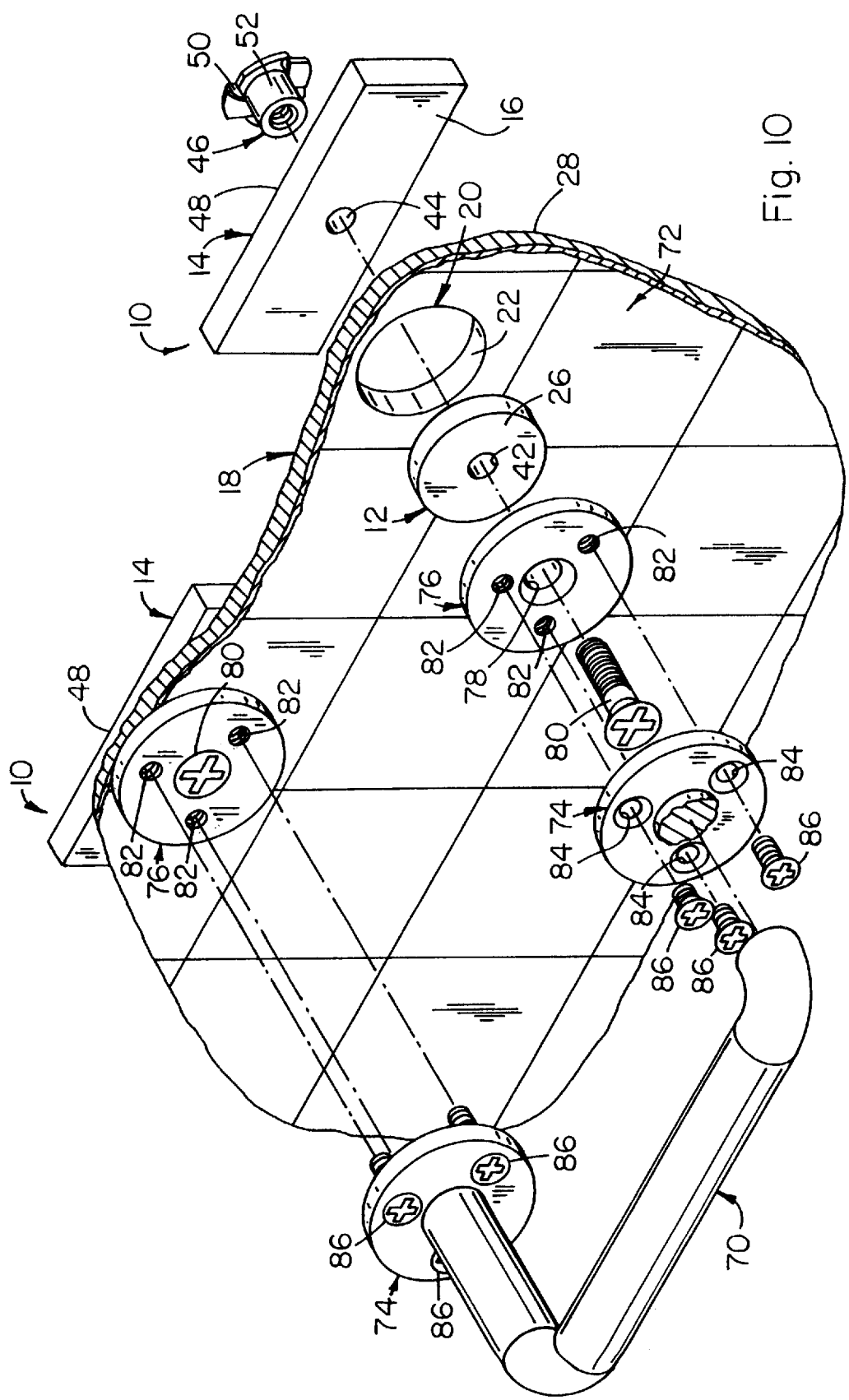
FIG. 10 is an isometric, exploded view of a safety grab bar, which is supported from a tiled wall that is secured to the drywall, and illustrates two shear resistant fastener assemblies, each at a respective end of the safety grab bar to provide support for the safety grab bar and illustrates one example of how the safety grab bar may be installed by use of the shear resistant fastener assemblies of the invention.

In reference to FIG. 10, this drawing shows, for instance, a safety grab bar 70, which may be supported from a tiled wall 72, for example, by a shear resistant fastener assembly 10 located at and behind each end of the safety grab bar. The tiled wall 72 is suitably bonded to the drywall 18. When installing safety grab bars, the use of a centered insert with respect to the anchor plate, as shown in FIGS. 7 and 8, would better serve to safely and securely hold the grab bar in place because the anchor plate would then bridge across the hole made through the drywall. Each end of the length of the safety grab bar would be supported by a separate shear resistant fastener assembly. In FIG. 10, each insert 12 of each shear resistant fastener assembly 10 is shown in dotted lines because it is hidden behind a respective circular flange 74 of the safety grab bar. Each insert has a circular configuration. Each anchor plate 14 is also show in dotted lines because it is also hidden behind the tiled wall 72 and the drywall 18.

The safety grab bar 70 may be secured to the tiled wall and drywall at each end of the safety grab bar, for example, by use of a three (3) inch circular mounting plate 76, which may be approximately ⅛th inch in thickness and has a hole 78 through its center adapted to receive therethrough a machine screw or bolt 80. The machine screw 80 extends through the hole 78 in the circular mounting plate 76, through the centered hole 42 in the insert 12 and through the hole 48 in the anchor plate 14 behind the tiled wall 42 and the drywall 18 to be received by the threaded bushing 52 of the tee nut 46 secured to the rear surface 48 of the anchor plate 14. The circular mounting plate 76 is then tightly secured to the shear resistant fastener assembly 10 by torquing the machine screw 80 to the tee nut 46, thus compressing the anchor plate 14 tightly against the rear surface 28 of the drywall 18. The circular mounting plate 76 has three other holes 82 made therethrough, each hole being spaced 120 degrees around the circular mounting plate from the next such hole. The safety grab bar 70 at each of its ends has the aforementioned circular flange 74, each circular flange also has three holes 84 each being spaced around the circular flange at 120 degrees from the next such hole. After the circular mounting plate 76 has been tightly secured to the shear resistant fastener assembly 10, then the circular flange 74 at each end of the safety grab bar 70 is secured to the circular mounting plate 76 by three appropriate sized machine screws or bolts 86, each of which extends through corresponding spaced hole 84 in the circular flange 74 and the circular mounting plate 76. The machine screws 86 along with the respective circular mounting plates 76 and the circular flanges 74 provide a very secure connection of the safety grab bar 70 to the tiled wall 72 and drywall 18.

It should be noted that each respective insert 12 in FIG. 10 is centered with respect to the length of each respective anchor plate 14 with the latter bridging equidistantly across and beyond the respective holes (not shown in this drawing figure) on each side thereof that are made in the tiled wall and the drywall to receive therethrough the respective anchor plate 14 and to receive therein the respective insert 12.

Figure 11:
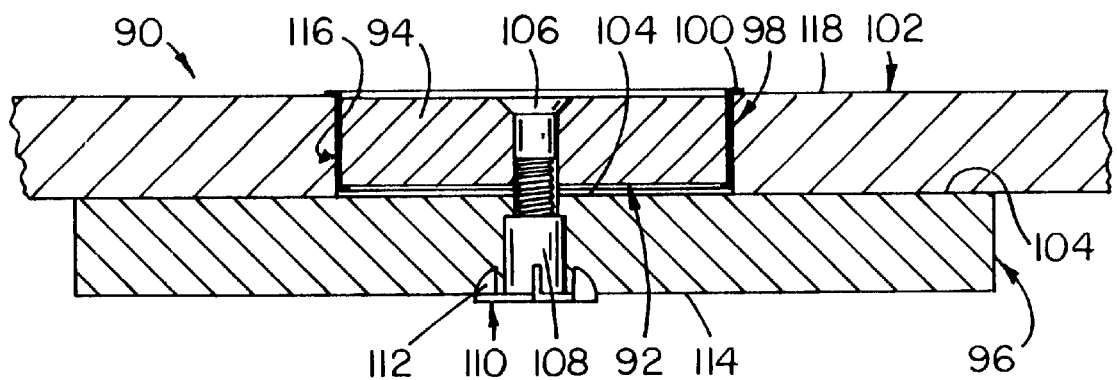
FIG. 11 is a side elevation view in cross-section of another embodiment of the shear resistant fastener assembly installed within a drywall, also shown in cross-section, and illustrates the circular insert as having a circular core circumferentially surrounded by a sleeve, and that the sleeve has formed at its outer front surface a flanged lip for bearing against the front surface of the drywall around the edge of the hole formed in the drywall for insertion within of the shear resistant fastener assembly.

In reference to FIG. 11, another embodiment of the shear resistant fastener assembly is shown at 90, and it comprises a circular insert 92 having a circular core 94, and an anchor plate 96. The circular core 94 has circumferentially surrounding and engaging it a sleeve 98, which may be made from metal, plastic or any other suitable material. The sleeve 98 has formed at its outer front surface a flanged lip 100. It should be noted that in this embodiment, the circular insert 92 has a thickness that is less than that of the drywall 102 and is also slightly spaced from the front surface 104 of the anchor plate 96. The circular insert 92 is connected to the anchor plate 96 preferably by a machine screw or bolt 106, and the remote end of the machine screw is received within the threaded bushing 108 of the tee nut 110 on the opposite side of the anchor plate. The tee nut 110 has prongs 112, which are embedded within the rear surface 114 of the anchor plate 96. When the machine screw 106 is tightened, the anchor plate is caused to be compressed toward the insert, which results in the flanged lip 100 acting in compression against the outer papered surface around the edge of the hole 116 made in the drywall 102. In other words, the flanged lip 100 of the sleeve is caused to slightly indent the papered edge around the hole 116 in the drywall and thus enhances the integrity of the paper against tearing. In this manner, the insert and its sleeve is caused to become essentially flush with the front surface 118 of the drywall because the flanged lip compresses slightly inwardly of the edge of the papered surface of the drywall around the edge of the hole. Therefore, there is no significant projection of the shear resistant fastener assembly 90 from the front surface 118 of the drywall 102 to interfere with any object or structure to be flatly supported from the drywall.

The flanged lip 100 of the sleeve 98, while the machine screw is being inserted and tightened, serves to prevent the insert from falling through the hole 116 in the drywall.

It should be noted here with respect to the embodiment shown in FIG. 11, the above-mentioned circular core 94 and the sleeve 98 could be integrally formed, that is formed in one unit, as by molding it or pressing it from suitable materials.

Figure 12:
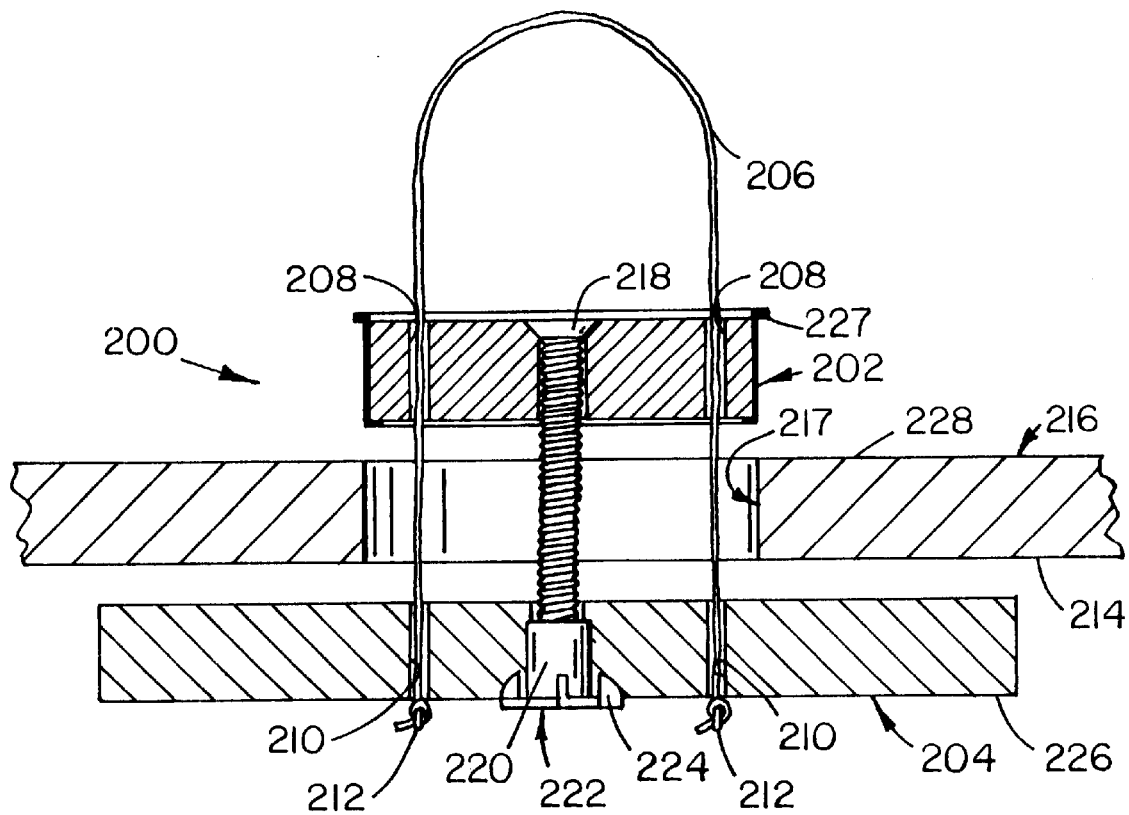
FIG. 12 is a side elevation view of still another embodiment of the shear resistant fastener assembly shown in cross-section and in which the insert has a integrally formed flanged lip, and the insert is illustrated as being loosely connected to the anchor plate by a flexible loop member prior to the insert being inserted within the hole in the drywall, also shown in cross-section, and also illustrating the anchor plate prior to its being drawn flatly against the rear surface of the drywall by the flexible loop member.
Figure 14:
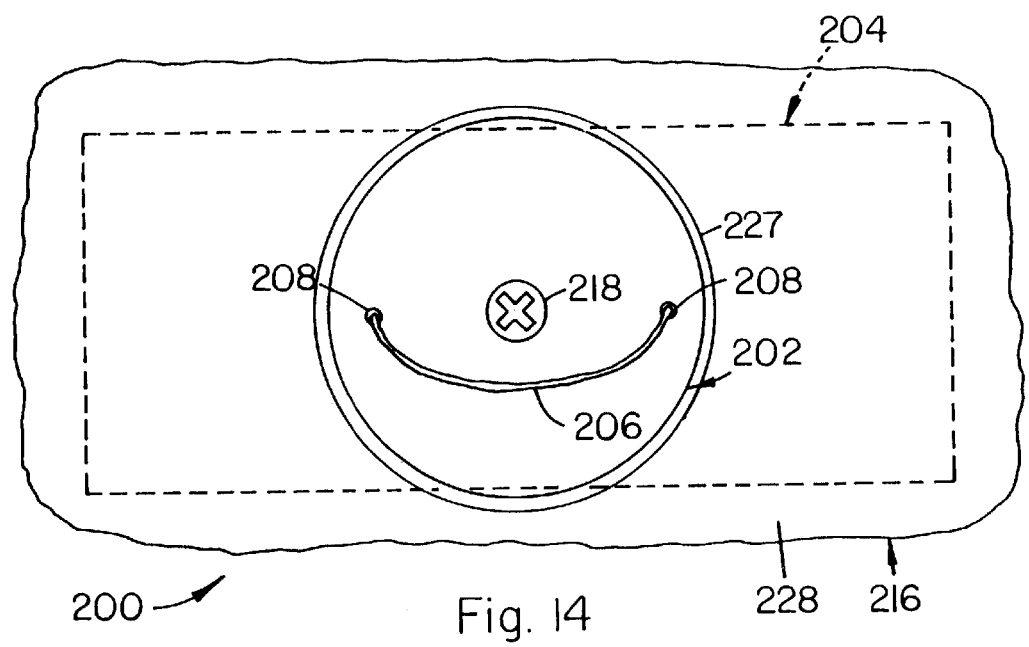
FIG. 14 is a plan view of the shear resistant fastener assembly embodiment shown in FIGS. 12 and 13, and illustrating the anchor plate in dotted lines because it is hidden behind the drywall.
Figure 13:
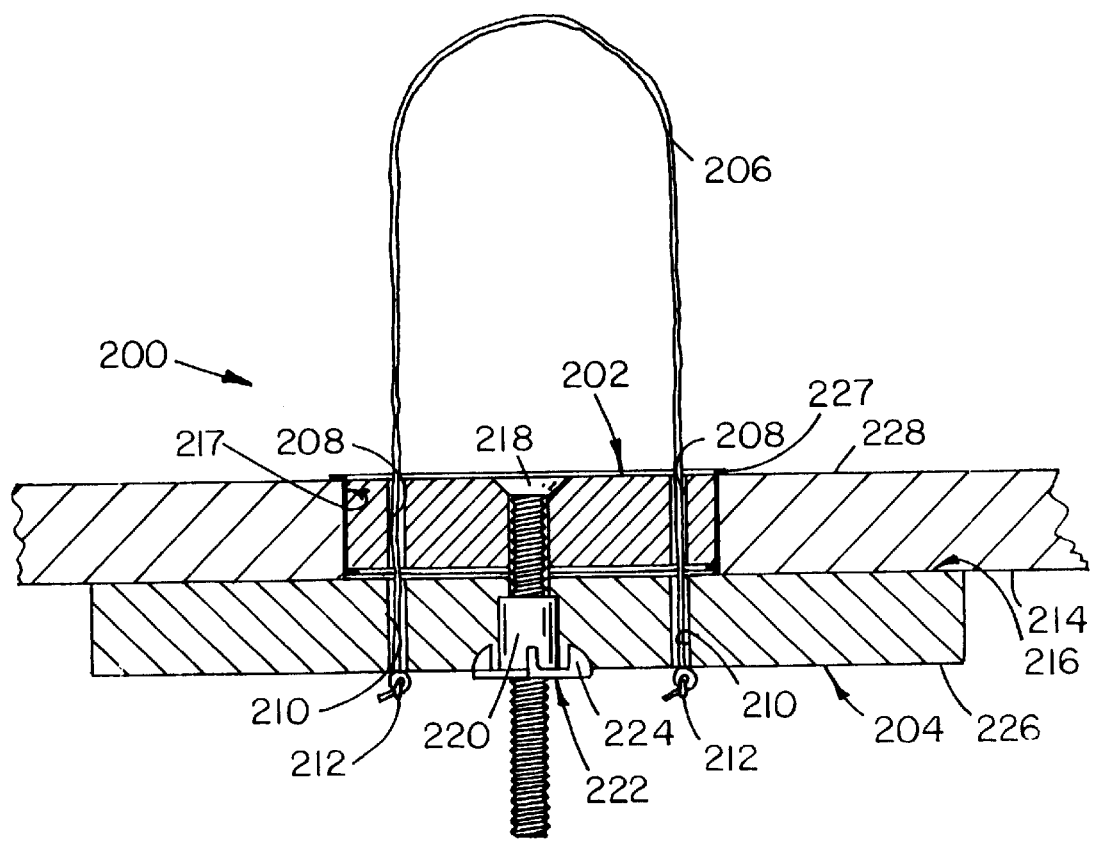
FIG. 13 is a side elevation view in cross-section of the shear resistant fastener assembly embodiment shown in FIG. 12, and illustrating the insert positioned within the hole in the drywall, also shown in cross-section, and illustrating the anchor plate having been pulled flatly against the rear surface of the drywall by the flexible loop member, the pulling action also serving at the same time to automatically align the respective guide holes with each other.

In reference to FIGS. 12, 13 and 14, still another embodiment of the shear resistant fastener assembly is shown at 200 and comprises an insert 202 and an anchor plate 204. In this embodiment the insert 202 and the anchor plate 204 are initially loosely connected together by a flexible loop member 206, as shown in FIG. 12. The flexible loop member may be formed from a nylon string similar somewhat to that used for grass trimming and lawn edging or for fishing line. A pair of guide holes 208 is formed at diametrically opposite locations in and through the IS insert 202, and another pair of guide holes 210 is formed at diametrically opposite locations in and through the anchor plate 204. Each one of the pair of guide holes 208 at one of the diametrically opposite locations in the insert 202 is in direct axial alignment with one of the pair of guide holes 210 at one of the diametrically opposite locations in the anchor plate 204.

The flexible loop member 206 has two distal ends 212, each of which is spaced from the other and is slidingly extended through one of the pair of guide holes 208 in the insert 202 and through the corresponding axially aligned guide hole 210 in the anchor plate 204 for securement at the rear surface of the anchor plate. Each distal end 212 behind the anchor plate may be formed into a knot or heat fused into such. When the anchor plate 204 is positioned out of sight behind the rear surface 214 of the drywall 216 and the insert 202 is positioned within the hole 217 formed in the drywall 216 (see FIG. 13), the flexible loop member 206 on the front side of the insert may be pulled upon to draw the anchor plate flatly against the rear surface 214 of the drywall 216. This action serves to provide proper alignment of the anchor plate with respect to the insert and the respective guide holes 208 and 210, and also to provide proper alignment of the respective holes for the machine screw or bolt made in the insert and in the anchor plate so as to bring them automatically into alignment. The insert 202 may either be inserted into the hole before pulling upon the flexible loop member, or may be inserted within the hole in the drywall at the same time the flexible loop member is being pulled upon to draw the anchor plate flatly against the rear surface 214 of the drywall. A machine screw or bolt 218 is also inserted into and through the center of the insert 202 and into and through the anchor plate 204 where its remote end is received within the threaded bushing 220 of the tee nut 222 located on the other side of the anchor plate 204. Although FIG. 12 illustrates an installed machine screw 218, it is generally not installed until after the insert has been positioned within the hole 217 made in the drywall 216 and the anchor plate is pulled flatly against the rear surface of the drywall. The tee nut has prongs 224, which are embedded within the rear surface 226 of the anchor plate. The circular insert 202 may be provided with an integrally formed flanged lip 227 or with a sleeve having a flanged lip (as shown in FIG. 11—see discussion for FIG. 11), which also serves to hold both the circular insert and anchor plate in position after the machine screw 218 is tightened. It should be noted from FIG. 13 that the insert has a thickness less than that of the drywall, as shown and discussed with respect to FIG. 11, and that the insert is spaced slightly from the anchor plate as a result of the flanged lip holding the insert slightly above the anchor plate. In this manner, as is the case with respect to FIG. 11, when the machine screw 218 is tightened, the insert and anchor plate are forced toward each other in compression, as is true in FIG. 11. The anchor plate 204 may be further secured in position by one or more screws extending through the drywall and into the anchor plate, if deemed necessary. Otherwise, when installing whatever structure or object to be supported by the shear resistant fastener assembly 200, the screw(s) inserted through the structure or object will then extend through the drywall and into the anchor plate to also and further secure the anchor plate in position behind the drywall. The exposed portions of the flexible loop member may be severed and removed before the structure or object to be supported is installed.

It should also be noted that the diametrically opposite located guide holes 208 in the insert 202 will also serve as indicators for the location of the anchor plate 204 now hidden behind the drywall 216. Measurements may be made from these guide holes in either direction to determine the general outlines on the front surface 228 of the drywall 216 of the length and width of the anchor plate hidden behind the drywall so that securing screws may be inserted within these general outlines in and through the drywall and into the anchor plate.

Figure 15:
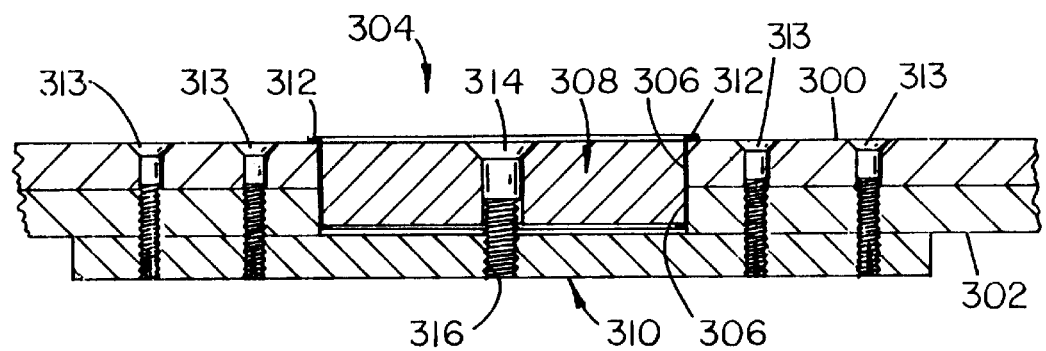
FIG. 15 is a side elevation view in cross-section of two overlapping panel members secured together by the shear resistant fastener assembly of the invention, also shown in cross-section.
Figure 16:
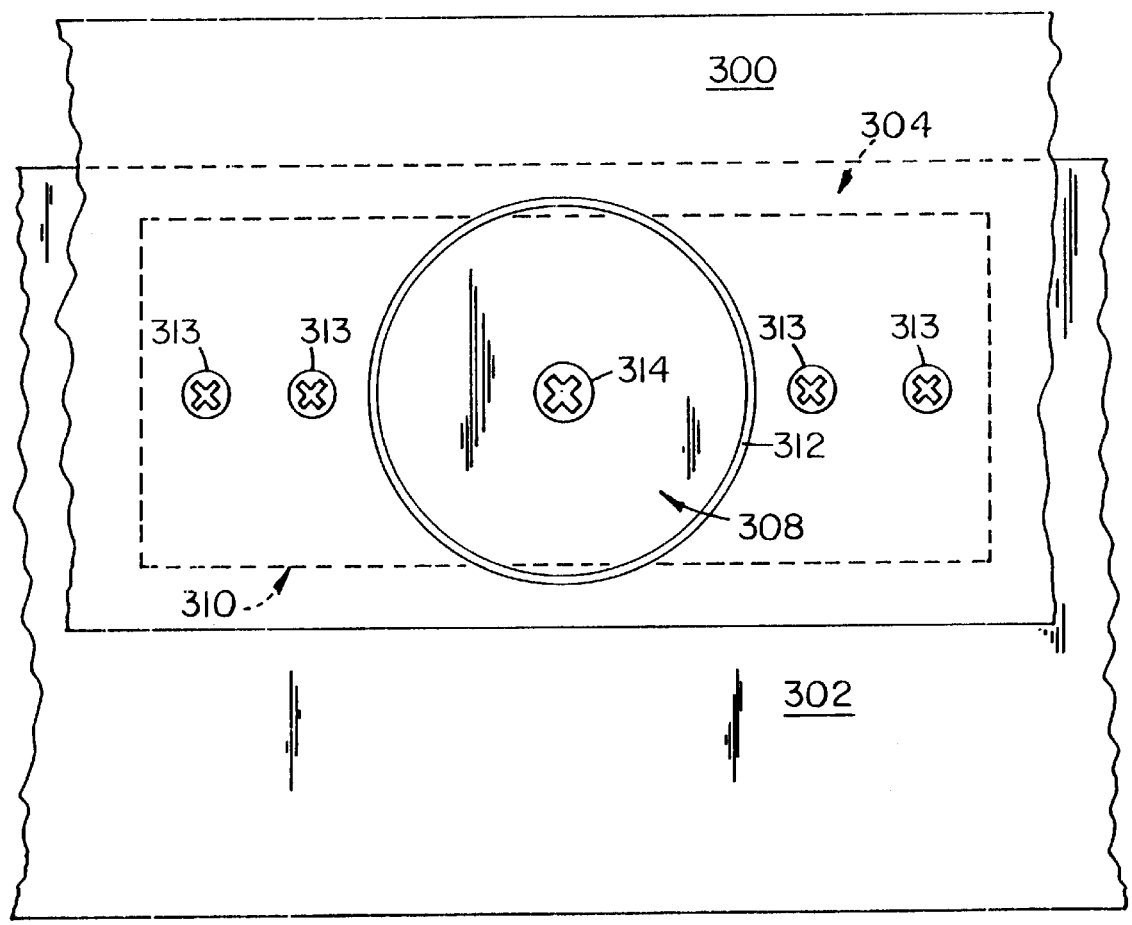
FIG. 16 is a plan view of the two overlapping panel members and the shear resistant fastener assembly shown in FIG. 15.

In reference to FIGS. 15 and 16, these drawings illustrate another use for the shear resistant fastener assembly of the invention. Overlapping panel members, such as the overlying panel member 300 and the underlying panel member 302, such as might be made from thin sheets of metal, plastic or other suitable materials, may be secured together by the shear resistant fastener assembly 304. More than one such shear resistant fastener assembly may be used, depending upon the length of the panel members and the number of panel members to be joined in overlapping relationship. A suitably configured hole 306 matching the configuration of the insert 308 is made through both the overlying panel member 300 and the underlying panel member 302, and the anchor plate 310 is inserted through both holes for subsequent positioning and securement flatly against the rear surface of the underlying panel member 302. The insert 308 is preferably provided with a flanged lip 312. The insert may be molded or pressed from suitable materials and the flanged lip would be formed at the same time. The flanged lip 312 serves to prevent the insert from inadvertently falling through the hole 306 formed in the overlapping panels until the anchor plate is suitably secured in the manner to be described. In the case of the use of metal sheets, for example, the shear resistant fastener assembly may also be made of metal and then self-tapping metal screws 313 may be used to extend through the overlying panel member 300, into and through the underlying panel member 302, and finally in and through the metal anchor plate 310. A suitable machine screw or bolt 314 may be used to secure the overlapping panel members to the insert and anchor plate, with the remote end of the machine screw being received into a tapped threaded hole 316 made in the anchor plate 310. The insert 308 has a thickness slightly less than the cumulative thicknesses of the overlying panel member 300 and the underlying panel member 302. When the machine screw 314 is tightened, the insert 308 and the anchor plate 310 are urged in compression toward each other and the flanged lip is caused to press firmly against the surface of the overlying panel member 300 around the edge of the hole 306. This example shows the versatility of the shear resistant fastener assembly of the invention for not only supporting objects and structures from walls, such as drywalls, but also for securing the aforementioned overlapping panel members securely together when there is no supporting framework behind the overlapping panel members to hold them in place. The surface area covered by the anchor plate 310 behind the underlying panel member 302 and overlying panel member 300 and into which screws (not shown) are inserted to hold the combination together would result in a significant holding power or permanent clamping together of the overlying panel members for whatever use might be made by overlapping panel members.

The invention has been described in detail with particular reference to preferred embodiments thereof, but it will be understood that variations and modifications can be effected within the spirit and scope of the invention.

I claim:

1. A shear resistant fastener assembly for supporting structures from a wall having a predetermined thickness and behind which there are no supporting studs, the wall defining therethrough an opening having a predetermined size and a predetermined configuration and bordered by an interior peripheral surface having said thickness of said wall, said fastener assembly comprising:

a) an anchor plate means for attachment to said wall and having a predetermined length, a predetermined width and a predetermined thickness and defining at least a flat front surface, said anchor plate means adapted to be inserted through said opening in said wall and for its flat front surface to be positioned flatly against the rear surface of said wall;

b) An insert means for connecting to said anchor plate means and for fitting closely within said opening and into engagement against said interior peripheral surface of said opening, said insert means defining a center and having a predetermined size and a predetermined configuration that are the same as that of said opening and defining a flat front surface and a flat rear surface; and c) means for connecting together said anchor plate means and said insert means and adapted to urge said anchor plate means and its flat front surface toward and against the flat rear surface of said insert means and also flatly against said rear surface of said wall;

d) said anchor plate means extending along its said predetermined length a predetermined distance from said center of said insert means and from one side of said insert means and also at a predetermined distance from said center of said insert means and from the other side of said insert means and being adapted to be attached to said wall by at least one fastener structure extending through the wall and into said anchor plate means at any location space from said insert means along said predetermined length of said anchor plate means.

2. A shear resistant fastener assembly as defined in claim 1, and wherein said anchor plate means has a rectangular configuration having said predetermined width and said predetermined thickness, each being less than said predetermined size of said opening so as to enable the introduction of the anchor plate means through said opening, and said predetermined length of said anchor plate means being greater than said predetermined size of said opening.

3. A shear resistant fastener assembly as defined in claim 2, and wherein said anchor plate means, when inserted through said opening, is rotatable around said insert means to position said anchor plate means to a predetermined position relative to the rear surface of said wall for receiving said fastener structure through said wall at the location of said predetermined position to which the anchor plate means has been rotated and into the anchor plate means along its said predetermined length spaced from said insert means.

4. A shear resistant fastener assembly as defined in claim 2, and wherein said insert means and said opening in said wall are circular in configuration and said insert means defines on its front surface at its outer periphery a flanged lip adapted to be engaged against the front surface of said wall.

5. A shear resistant fastener assembly as defined in claim 1, and wherein said anchor plate means has a rectangular configuration, the width and thickness of which is less than said opening and the length of which is greater than said opening and extends a greater distance from the center of said insert means on one side of said insert means than from its other side.

6. A shear resistant fastener assembly as defined in claim 5, and wherein said insert means and said anchor plate means are secured together and said insert means includes a handle detachably connected to the center of said front surface of said insert means, said handle adapted to aid in manually manipulating said anchor plate means for insertion through said opening and to hold same in a predetermined position against the rear surface of said wall until said anchor plate means is secured against the rear surface of said wall.

7. A shear resistant fastener assembly as defined in claim 6, and wherein said insert means has on its front flat surface an indicating mark pointing toward the center of the width of said anchor plate means to show the location of said anchor plate means when it is out of sight behind said wall.

8. A shear resistant fastener assembly as defined in claim 5, and wherein said insert means and said opening in said wall are circular in configuration and said insert means defines a front surface and a rear surface and also defines on its front surface at its outer periphery a flanged lip adapted to be engaged against the front surface of said wall.

9. A shear resistant fastener assembly as defined in claim 1, and wherein said insert means defines on its front surface at its outer periphery a flanged lip adapted to be engaged against the front surface of said wall.

10. A shear resistant fastener assembly as defined in claim 1, and wherein said means for connecting together said anchor plate means and said insert means includes a threaded screw extending through said center of said insert means and into said anchor plate means.

11. A shear resistant fastener assembly as defined in claim 1, and wherein said anchor plate means and said insert means each defines a pair of guide holes formed at diametrically opposite locations in and through said insert means and formed at diametrically opposite locations in and through said anchor plate means, each of said pair of guide holes at one of said diametrically opposite locations in said insert means being in direct axial alignment with one of said pair of guide holes at one of said diametrically opposite locations in said anchor plate means; and wherein said means for connecting together said anchor plate means and said insert means includes a flexible loop member having two distal ends each of which spaced from the other has been slidingly extended through one of said pair of guide holes in said insert means and through the corresponding axially aligned guide hole in said anchor plate means for securement at the rear surface of said anchor plate means; said flexible loop member, when said anchor plate means is positioned out of sight behind said rear surface of said wall and said insert means is in position within said interior peripheral surface of said opening, upon being manually pulled urges the anchor plate means to be brought against said rear surface of said wall and into direct axial alignment of its pair of guide holes with the pair of guide holes in said insert means.

12. A shear resistant fastener assembly as defined in claim 11, and wherein said insert means and said opening in said wall are circular in configuration and said insert means defines on its front surface at its outer periphery a flanged lip adapted to be engaged against the front surface of said wall.

13. A shear resistant fastener assembly as defined in claim 11, and wherein said anchor plate means has a rectangular configuration, the width and thickness of which is such as to enable the introduction of the anchor plate through said opening having said predetermined size and configuration, and the length of which is greater than said predetermined size and configuration of said opening, the length of said anchor plate means being centered with respect to the center of said insert means.

14. A shear resistant fastener assembly as defined in claim 11, and wherein said anchor plate means has a rectangular configuration, the width and thickness of which is less than said predetermined size and configuration of said opening, and the length of which is greater than said predetermined size and configuration of said opening and extends a greater distance from the center of said insert means on one side of said insert means than from its other side.

15. A shear resistant fastener assembly as defined in claim 14, and wherein said insert means and said opening are circular in configuration and said insert means includes an outer annular sleeve member adapted to engage against said interior peripheral surface of the opening in said wall.

16. A shear resistant fastener assembly as defined in claim 14, and wherein said insert means and said opening in said wall are circular in configuration and said insert means defines a circular core member having a circular peripheral surface and includes an annular sleeve encircling and engaging said circular peripheral surface, said annular sleeve having a front surface and a rear surface and defining on its front surface at its outer periphery a flanged lip adapted to be engaged against the front surface of said wall.

17. A shear resistant fastener assembly as defined in claim 1, and wherein said insert means and said opening in said wall are circular in configuration and said insert means includes an outer annular sleeve member adapted to engage against said interior peripheral surface of the opening in said wall.

18. A shear resistant fastener assembly as defined in claim 17, and wherein said anchor plate means and said insert means each defines a pair of guide holes formed at diametrically opposite locations in and through said insert means and formed at diametrically opposite locations in and through said anchor plate means, each of said pair of guide holes at one of said diametrically opposite locations in said insert means being in direct axial alignment with one of said pair of guide holes at one of said diametrically opposite locations in said anchor plate means; and wherein said means for connecting together said anchor plate means and said insert means includes a flexible loop member having two distal ends each of which spaced from the other has been slidingly extended through one of said pair of guide holes in said insert means and through the corresponding axially aligned guide hole in said anchor plate means for securement at the rear surface of said anchor plate means; said flexible loop member, when said anchor plate means is positioned out of sight behind said rear surface of said wall and said insert means is in position within said interior peripheral surface of said opening, upon being manually pulled urges the anchor plate means to be brought against said rear surface of said wall and into direct axial alignment of its pair of guide holes with the pair of guide holes in said insert means.

19. A shear resistant fastener assembly as defined in claim 1, and wherein said insert means and said opening in said wall are circular in configuration and said insert means defines a circular core member having a circular peripheral surface and includes an annular sleeve encircling and engaging against said circular peripheral surface, said annular sleeve having a front surface and a rear surface and defining on its front surface at its outer periphery a flanged lip adapted to be engaged against the front surface of said wall.

20. A shear resistant fastener assembly as defined in claim 19, and wherein said anchor plate means and said insert means each defines a pair of guide holes formed at diametrically opposite locations in and through said insert means and formed at diametrically opposite locations in and through said anchor plate means, each of said pair of guide holes at one of said diametrically opposite locations in said insert means being in direct axial alignment with one of said pair of guide holes at one of said diametrically opposite locations in said anchor plate means; and wherein said means for connecting together said anchor plate means and said insert means includes a flexible loop member having two distal ends each of which spaced from the other has been slidingly extended through one of said pair of guide holes in said insert means and through the corresponding axially aligned guide hole in said anchor plate means for securement at the rear surface of said anchor plate means; said flexible loop member, when said anchor plate means is positioned out of sight behind said rear surface of said wall and said insert means is in position within said interior peripheral surface of said opening, upon being manually pulled urges the anchor plate means to be brought against said rear surface of said wall and into direct axial alignment of its pair of guide holes with the pair of guide holes in said insert means.

21. A shear resistant fastener assembly for securing together overlapping panel members behind which there are no structural supporting members, each panel member having a predetermined thickness and defining therethrough an opening having the same predetermined size and the same predetermined configuration as the opening in the other panel member, each said opening being bordered by an interior peripheral surface, said fastener assembly comprising:

a) an anchor plate means for attachment to said overlapping panel members and having a predetermined length, a predetermined width and a predetermined thickness and defining at least a flat front surface, said anchor plate means adapted to be inserted through each of said openings in said overlapping panel members and for its flat front surface to be positioned flatly against the rear surface of the innermost panel member of said overlapping panel members;

b) an insert means for connecting to said anchor plate means and for fitting closely within said openings and into engagement against said interior peripheral surface of each said opening, said insert means defining a center and having a predetermined size and a predetermined configuration that are the same as that of each of said openings in said panel members and having a predetermined thickness that is the same as the combined thicknesses of the overlying panel members, said insert means defining a front surface and a flat rear surface; and c) means for connecting together said anchor plate means and said insert means and adapted to urge said anchor plate means and its flat front surface toward and against the flat rear surface of said insert means and also flatly against the rear surface of the innermost panel member of said overlapping panel members;

d) said anchor plate means extending along its said predetermined length a predetermined distance from said center of said insert means and from one side of said insert means and also at a predetermined distance from the center of said insert means and from the other side of said insert means and being adapted to be attached to said overlapping panel members by at least one fastener structure extending through said overlapping panel members and into said anchor plate means at any location spaced from said insert means along said predetermined length of said anchor plate means.

* * * * *